United States Patent
Chan et al.

(10) Patent No.: US 8,949,510 B2
(45) Date of Patent: Feb. 3, 2015

(54) BUFFER MANAGING METHOD AND BUFFER CONTROLLER THEREOF

(75) Inventors: Li-Hsiang Chan, Hsinchu (TW); Po-Yen Liu, Hsinchu (TW)

(73) Assignee: Skymedi Corporation, Hsinchu Science Park, Hsinchu (TW)

( * ) Notice: Subject to any disclaimer, the term of this patent is extended or adjusted under 35 U.S.C. 154(b) by 256 days.

(21) Appl. No.: 13/345,767

(22) Filed: Jan. 9, 2012

(65) Prior Publication Data
US 2013/0179623 A1    Jul. 11, 2013

(51) Int. Cl.
*G06F 12/00* (2006.01)
*G06F 12/08* (2006.01)
*G06F 13/16* (2006.01)

(52) U.S. Cl.
CPC ............ *G06F 12/08* (2013.01); *G06F 12/0802* (2013.01); *G06F 12/0806* (2013.01); *G06F 13/16* (2013.01); *G06F 13/1605* (2013.01); *G06F 13/1626* (2013.01)
USPC ........... 711/103; 709/219; 709/226; 365/220; 365/189

(58) Field of Classification Search
CPC ............ G06F 12/0246; G06F 12/0802; G06F 13/4081; G06F 17/30873; G06F 1/1601; G06F 1/1616; G06F 1/1637; G06F 1/1641; G06F 1/185; G06F 3/048; G06F 3/0481; G06F 3/0483; G06F 3/04883; G06F 3/04897
USPC ............ 711/103; 709/219, 226; 365/220, 189
See application file for complete search history.

(56) References Cited

U.S. PATENT DOCUMENTS

| | | | | |
|---|---|---|---|---|
| 7,450,457 | B2 * | 11/2008 | Shiota et al. | 365/220 |
| 7,529,865 | B1 * | 5/2009 | Venkatesh et al. | 710/33 |
| 7,548,982 | B2 * | 6/2009 | Gu et al. | 709/228 |
| 7,716,332 | B1 * | 5/2010 | Topfl et al. | 709/226 |
| 8,504,411 | B1 * | 8/2013 | Subasic et al. | 705/7.33 |
| 8,676,741 | B2 * | 3/2014 | Ulinski et al. | 706/52 |
| 2004/0128618 | A1 * | 7/2004 | Datta | 715/513 |
| 2008/0288863 | A1 * | 11/2008 | Bohannon | 715/255 |
| 2011/0099323 | A1 | 4/2011 | Syu | |
| 2012/0110239 | A1 * | 5/2012 | Goss et al. | 711/103 |

FOREIGN PATENT DOCUMENTS

| | | |
|---|---|---|
| TW | 275688 | 5/1996 |
| WO | 9429853 A1 | 12/1994 |

* cited by examiner

*Primary Examiner* — Arpan P. Savla
*Assistant Examiner* — Mohamed Gebril
(74) *Attorney, Agent, or Firm* — Winston Hsu; Scott Margo

(57) ABSTRACT

By assigning a slave unit and at least one master unit in a buffer controller, clocks of the at least one master unit can be unified with a clock of the slave unit. A buffer status array is assigned for the slave unit in a buffer, and either a range status array or a queue status array is assigned for the master unit in the buffer for performing operations of the buffer controller in an accessing-by-block manner or in an accessing-by-spaced-interval manner. The master unit cooperated with the slave unit is determined from the at least one master unit by using a starvation-preventing algorithm.

26 Claims, 13 Drawing Sheets

Move a datum from a first physical memory block to a second physical memory block when a slot in a range status array corresponding to a first slot of a buffer status array mapping the first physical memory block has the value 1 and when a slot in a queue status array corresponding to a second slot of the buffer status array mapping the second physical memory block has the value 1 ⟶ 602

FIG. 12

Accessing a datum buffered at a physical memory segment of the buffer when a first slot in the queue status array QSA_I corresponding to a second slot of the buffer status array MSA mapping a physical memory segment has the value 1 and when a third slot in the range status array RSA_R corresponding to the second slot of the buffer status array MSA_has the value 1 ⎯702

FIG. 13

BUFFER MANAGING METHOD AND BUFFER CONTROLLER THEREOF

BACKGROUND OF THE INVENTION

1. Field of the Invention

The present invention relates to a buffer managing method and a buffer controller thereof, and more particularly, to a buffer managing method of synchronizing units of a buffer controller and the buffer controller thereof.

2. Description of the Prior Art

Buffer controlling related to mass data processing is always an important issue, where the mass data includes multimedia data streams. For buffering the mass data, different high-speed interfaces and drivers of different operating systems are also utilized in a buffer controller.

However, using the different interfaces and drivers may introduce compatibility-related issues in the buffer controller as well, for example, asynchronous clocks of different elements in a single buffer controller. Please refer to FIG. 1, which schematically illustrates a conventional buffer controller 100 and how it cooperates with a host 110 and a flash memory 120, for explaining the compatibility-related issues mentioned above.

As shown in FIG. 1, the buffer controller 100 serves as a bridge between the host 110 and the flash memory 120 in data transmission, where the buffer controller 100 and the flash memory 120 may be disposed in a same hardware device. The buffer controller 100 includes an interface 130, a data processing unit 140, a rear processing engine 150, a micro processor 160, and a buffer 170.

The interface 130 is utilized for receiving data from the host 110 in correspondence with an operating system utilized by the host 110. The data processing unit 140 is utilized for processing data received by the interface 130. The rear processing engine 150 is utilized for checking the data processed by the data processing unit 140, such as error correction so that correctness of the data transmitted to the flash memory 120 can be ensured. The micro processor 160 is utilized for coordinating operations of the interface 130, the data processing unit 140, the rear processing engine 150, and the buffer 170, where the buffer 170 is utilized for buffering process variables or information for the micro processor 160.

As can be observed from FIG. 1, if the interface 130, the data processing unit 140, the rear processing engine 150, the micro processor 160, and the buffer 170 are operated under a plurality of asynchronous clocks respectively, correctness of data processed by the elements of the buffer 100 may be significantly decreased.

SUMMARY OF THE INVENTION

The claimed invention discloses a buffer managing method. The buffer managing method comprises receiving a datum from a host to a physical memory segment of a buffer of a buffer controller when a buffer status slot mapping the physical memory segment indicates allowance of modifying the physical memory segment and when an accessing-by-block status slot corresponding to the buffer status slot indicates that the physical memory segment is a current datum receiving target; and outputting a datum from the physical memory segment to a flash memory when the buffer status slot mapping the physical memory segment indicates disallowance of modifying the physical memory segment and when the accessing-by-block status slot corresponding to the buffer status slot indicates that the physical memory segment is a current datum outputting source. The buffer status slot is an element of a buffer status array. The accessing-by-block status slot is an element of an accessing-by-block status array utilized for accessing a plurality of physical memory segments mapped by a corresponding plurality of continuous buffer status slots in the buffer status array at a time.

The claimed invention discloses a buffer managing method. The method comprises receiving a datum from a host to a physical memory segment of a buffer of a buffer controller when a buffer status slot mapping the physical memory segment indicates allowance of modifying the physical memory segment and when an accessing-by-spaced-interval status slot corresponding to the buffer status slot indicates that the physical memory segment is a current datum receiving target; and outputting a datum from the physical memory segment to a flash memory when the buffer status slot mapping the physical memory segment indicates disallowance of modifying the physical memory segment and when the accessing-by-spaced-interval status slot corresponding to the buffer status slot indicates that the physical memory segment is a current datum outputting source. The buffer status slot is an element of a buffer status array. The accessing-by-spaced-intervals status slot is an element of an accessing-by-spaced-interval status array utilized for accessing a plurality of physical memory segments mapped by a corresponding plurality of spaced-by-interval buffer status slots in the buffer status array.

The claimed invention discloses a buffer managing method. The buffer managing method comprises moving a datum from a first physical memory segment of a buffer of a buffer controller to a second physical memory segment of the buffer when an accessing-by-block status slot corresponding to a first buffer status slot mapping the first physical memory segment indicates that the first physical memory segment is a current source of a data moving instruction for moving the datum and when an accessing-by-spaced-interval status slot corresponding to a second buffer status slot mapping the second physical memory segment indicates that the second physical memory segment is a current target of the data moving instruction. Both the first and second buffer status slots are elements of a buffer status array. The accessing-by-block status slot is an element of an accessing-by-block status array utilized for accessing a plurality of physical memory segments mapped by a corresponding plurality of continuous buffer status slots in the buffer status array at a time. The accessing-by-spaced-intervals status slot is an element of an accessing-by-spaced-interval status array utilized for accessing a plurality of physical memory segments mapped by a corresponding plurality of spaced-by-interval buffer status slots in the buffer status array.

The claimed invention discloses a buffer managing method. A buffer managing method comprises accessing a datum buffered at a physical memory segment of a buffer according to a data moving instruction, when a first slot in an accessing-by-spaced interval status slot corresponding to a second slot of a buffer status array mapping a physical memory segment of a buffer indicates that the physical memory segment is allowed to be accessed, and when a third slot in an accessing-by-block status slot corresponding to the second slot of the buffer status array indicates that the physical memory segment is allowed to be accessed. The buffer status slot is an element of a buffer status array. The accessing-by-block status slot is an element of an accessing-by-block status array utilized for accessing a plurality of physical memory segments mapped by a corresponding plurality of continuous buffer status slots in the buffer status array at a time. The accessing-by-spaced-intervals status slot is an element of an accessing-by-spaced-interval status array utilized for accessing a plurality of physical memory segments mapped by a corresponding plurality of spaced-by-interval buffer status slots in the buffer status array.

The claimed invention further discloses a buffer controller. The buffer controller comprises a buffer, at least one master unit, and an arbitration module. The buffer is utilized for storing a plurality of physical memory segments, a buffer status array having a plurality of buffer status slots mapping to the plurality of physical memory segments, an accessing-by-block status array having a plurality of accessing-by-block status slots corresponding to the plurality of buffer status slots, and an accessing-by-spaced-interval status array having a plurality of accessing-by-spaced-interval status slots corresponding to the plurality of buffer status slots. The at least one master unit is utilized for accessing the buffer. The arbitration module is utilized for determining a master unit among the at least one master unit by using a starvation-preventing algorithm when the buffer controller executes an instruction.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 12 illustrates a flowchart of performing an internal data moving instruction performed by a buffer controller according to embodiments shown in FIG. 7.

FIG. 13 illustrates a flowchart of performing a partial valid data moving instruction performed by a buffer controller according to embodiments shown in FIG. 8.

DETAILED DESCRIPTION

For neutralizing the asynchronous clock issue between elements of the buffer controller 100, the present invention discloses a buffer managing method which can be implemented on a buffer controller.

Figure 1:
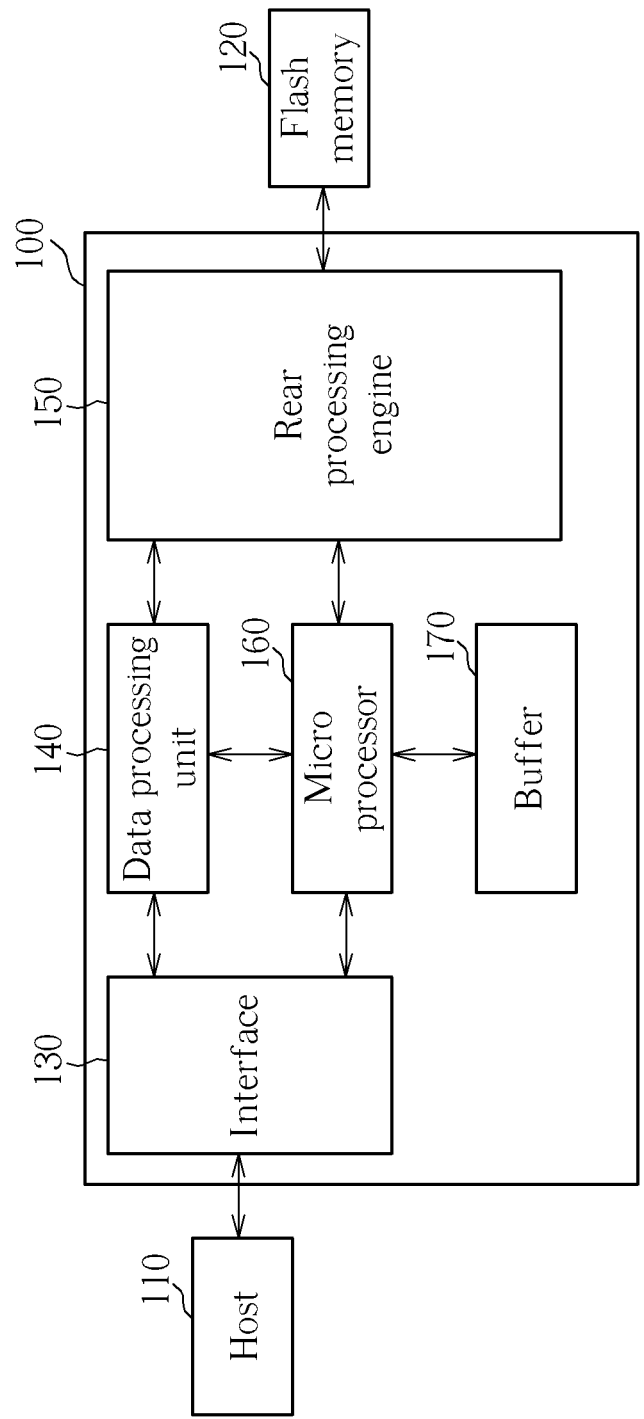
FIG. 1 schematically illustrates a conventional buffer controller and how it cooperates with a host and a flash memory.
Figure 2:
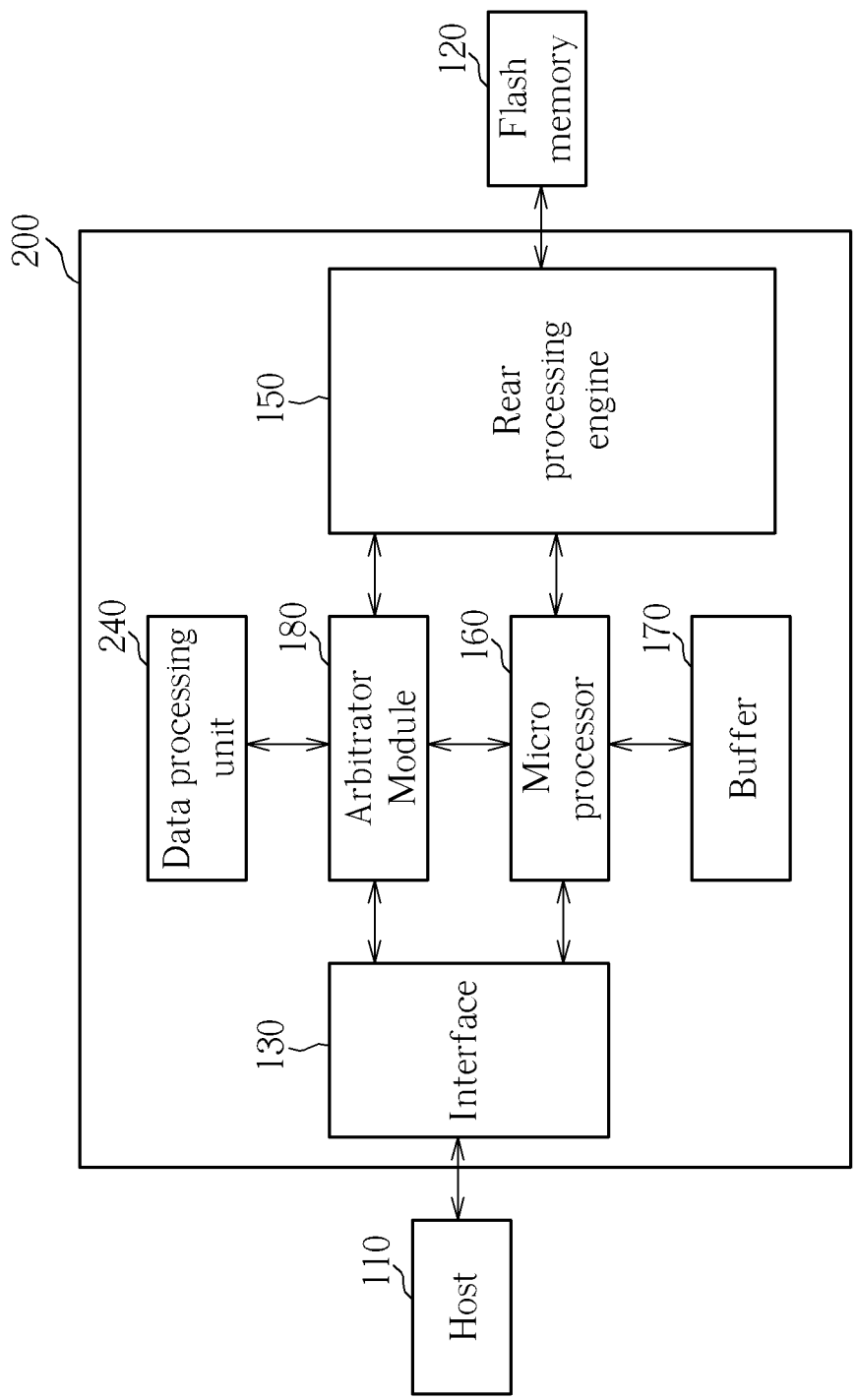
FIG. 2 illustrates a buffer controller for implementing the buffer managing method of the present invention.

Please refer to FIG. 2, which illustrates a buffer controller 200 for implementing the buffer managing method of the present invention. In comparison to the buffer controller 100 shown in FIG. 1, the buffer controller 200 further has an arbitrator module 180, and has a data processing unit 240 implemented by the buffer managing method of the present invention for replacing the data processing unit 140.

In FIG. 2, the buffer 170 acts as a slave unit, whereas the interface 130, the micro processor 160, and the rear processing engine 150 act as master units, so that the clocks utilized by the interface 130, the micro processor 160, and the rear processing engine 150 can be synchronous with a clock utilized by the buffer 170. One of purposes of the disclosed buffer management method is to render the buffer 170 to be the center of synchronizing operations of the interface 130, the micro processor 160, and the rear processing engine 150. The arbitrator module 180 is configured to pick one of the master units when at least one of the interface 130, the micro processor 160, and the rear processing engine 150 competes for resources of the buffer 170, i.e. the slave unit. In one embodiment of the present invention, a Round-Robin algorithm is utilized for implementing the arbitration mechanism of the arbitrator module 180; however, in other embodiments of the present invention, other starvation-preventing algorithms may also be utilized for implementing the arbitration mechanism of the arbitrator module 180, so as to prevent any one of the master units from waiting for accessing the resources of the buffer 170 for a long period of time.

A specific memory segment is assigned in the buffer 170 for indicating current statuses of other memory segments in the buffer 170; a status of a memory segment in the buffer 170 may include whether the memory segment can be currently written, read, or neither.

With the aid of the slave unit, i.e. the buffer 170, clocks of the slave unit and the master units within the buffer controller 200 can be coordinated, however, the coordination provided by the buffer 170 still requires a buffer managing method disclosed in the present invention for implementation.

The following diagrams are utilized for explaining how the disclosed buffer management method works under different conditions.

Figure 3:
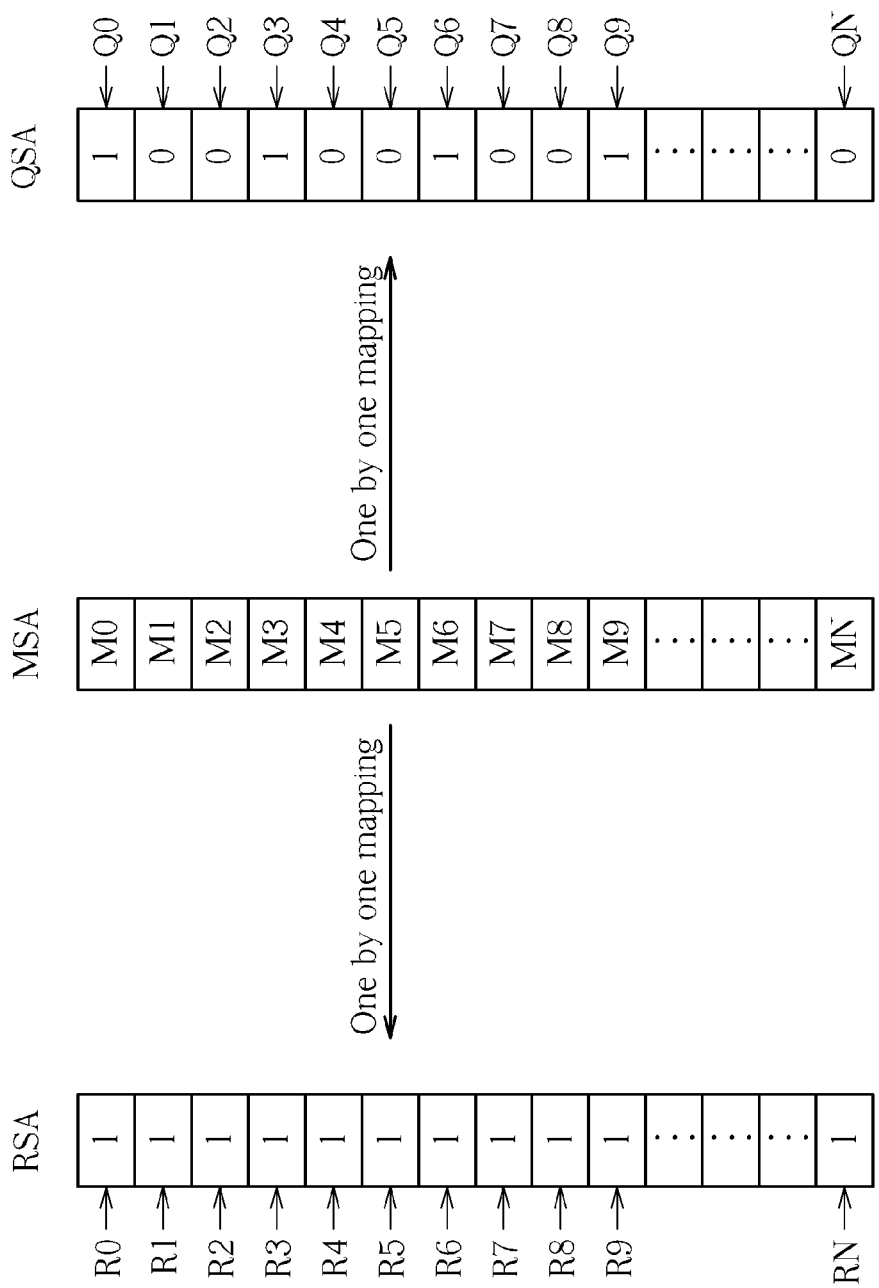
FIG. 3 illustrates an exemplary memory scheme for indicating statuses of physical memory segments in a buffer shown in FIG. 2.

Please refer to FIG. 3, which illustrates an exemplary memory scheme for indicating statuses of physical memory segments in the buffer 170. In FIG. 3, a range status array RSA and a queue status array QSA are established in the buffer 170 for indicating next-step statuses of (N+1) slots M0, M1, M2, M3, M4, M5, M6, M7, M8, M9, . . . , and MN of a buffer status array MSA established in the buffer 170 also, where the (N+1) mapping slots M0, M1, . . . , and MN map (N+1) physical memory segments in an one-by-one manner, and where N indicates a positive integer. Note that the (N+1) physical memory segments mapped by the (N+1) slots M0, M1, . . . , and MN are not necessarily continuous in the buffer 170. The range status array RSA includes (N+1) slots R0, R1, R2, R3, R4, R5, R6, R7, R8, R9, . . . , and RN, and has a one-by-one mapping with mapping slots of the buffer status array MSA and with the physical memory segments one-by-one mapped by the buffer status array MSA. Similarly, the queue status array QSA also includes (N+1) slots Q0, Q1, Q2, Q3, Q4, Q5, Q6, Q7, Q8, Q9, . . . , and QN, and has a one-by-one mapping with mapping slots of the buffer status array MSA and with the physical memory segments one-by-one mapped by the buffer status array MSA. For example, the range status of the slot M5 can be uniquely determined by the current value of the slot R5; similarly, the queue status of the slot M5 is also uniquely indicated by the value of the slot Q5. In one embodiment of the present invention, values of the above-mentioned slots in the buffer status array MSA, the queue status array QSA, and the range status array RSA may be 0 or 1, i.e. binary.

There are certain rules for the memory scheme shown in FIG. 3 as follows:

(a) One-by-one mapping between the buffer status array MSA and the range status array RSA, and the one-by-one mapping between the buffer status array MSA and the queue status array QSA. Besides, a slot having value 0 in the buffer status array MSA indicates that the slot is allowed to be written and its value is updated to 1 after being written; a slot having value 1 in the buffer status array MSA indicates that the slot is allowed to be read and its value is updated to be 0 after being read.

(b) The value 0 in one slot of the range status array RSA indicates prohibition of access to a corresponding physical memory segment, whereas the value 1 in the slot of the range status array RSA indicates allowance of modifying a physical memory segment mapped by a corresponding slot in the buffer status array MSA; after writing data to a physical memory segment, the value of the corresponding slot in the buffer status array MSA is updated to 1; and after reading data from a physical memory segment, the value of the corresponding slot in the buffer status array MSA is updated to 0. Besides, when the range status array RSA is utilized for indicating access states to corresponding physical memory segments, the corresponding physical memory segments are indicated by a plurality of continuous slots in the buffer status array MSA, as illustrated by the range status array RSA in FIG. 5.

(c) The value 0 or 1 in one slot of the queue status array QSA is defined by the same definitions as the range status RSA. However, unlike the usage of the range status array RSA, when the queue status array QSA is utilized for indicating access states to corresponding physical memory segments, the corresponding physical memory segments are indicated by a plurality of discontinuous (i.e. discrete) slots in the buffer status array MSA, as illustrated by the queue status array QSA in FIG. 6.

(d) Physical memory segments mapped by slots of the buffer status array MSA may have different sizes from each other.

(e) Only one among the range status array RSA and the queue status array QSA is referred at a time when reading or writing physical memory segments.

(f) Memory wrapping is utilized by the buffer status array MSA, the range status array RSA, and the queue status array QSA.

Figure 4:
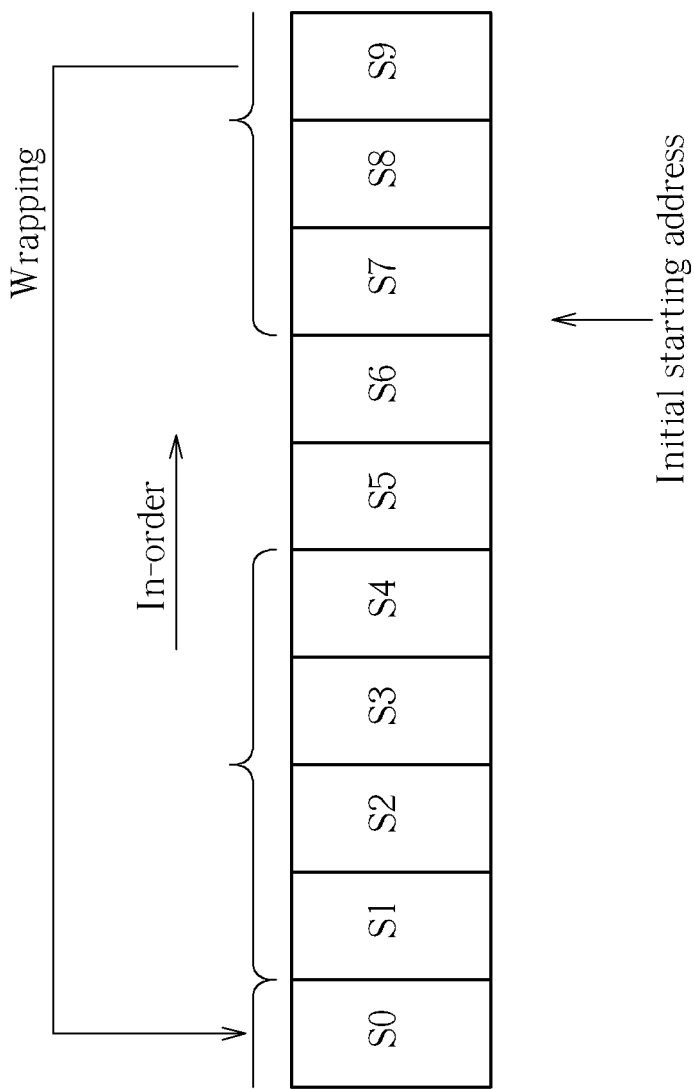
FIG. 4 explains the concept of memory wrapping utilized in the present invention.

Please refer to FIG. 4, which explains the concept of memory wrapping indicated in the topic (f). In FIG. 4, there are a plurality of exemplary and continuous memory addresses S0, S1, ..., and S9. When the plurality of memory address S0, S1, ..., and S9 are accessed by memory wrapping, it means accessing the memory addresses S0, S1, ..., and S9 in an in-order, cyclic, and block-by-block manner. For example, four continuous memory addresses can be a unit of processing at one time, and the memory address S7 is assumed to be a current starting address of accessing; then, performing the memory wrapping means accessing the memory addresses in an order of (S7, S8, S9, S0), (S1, S2, S3, S4), (S5, S6, S7, S8), (S9, S0, S1, S2), ..., etc.

The buffer managing method of the present invention is performed based on the memory scheme shown in FIG. 3 and has a basic flow including:

(T1) Determine using the range status array RSA or using the queue status array QSA.

(T2) Set the determined status array, and determine a size of physical memory segments to be accessed at one time according to a current system requirement.

(T3) Determine a direction of using the determined status array and the buffer status array MSA for accessing corresponding physical memory segments.

(T4) Set an initial front pointer.

Based on the above base steps (T1)-(T4), the buffer managing method of the present invention may be utilized for different conditions as follows:

(A) Read or write physical memory segments by using the range status array RSA.

(B) Read or write physical memory segments by using the queue status array QSA.

(C) Data moving by using both the range status array RSA and the queue status array QSA.

(D) Partial valid data moving by using both the range status array RSA and the queue status array QSA.

The above-mentioned conditions will be explained and illustrated as follows:

(A) Read or Write Physical Memory Segments by Using the Range Status Array RSA:

By following the above-mentioned basic flow, when a master unit is chosen by the slave unit, i.e. by the data processing unit 140, the range status array RSA is selected and set according to the steps (T1) and (T2).

Figure 5:
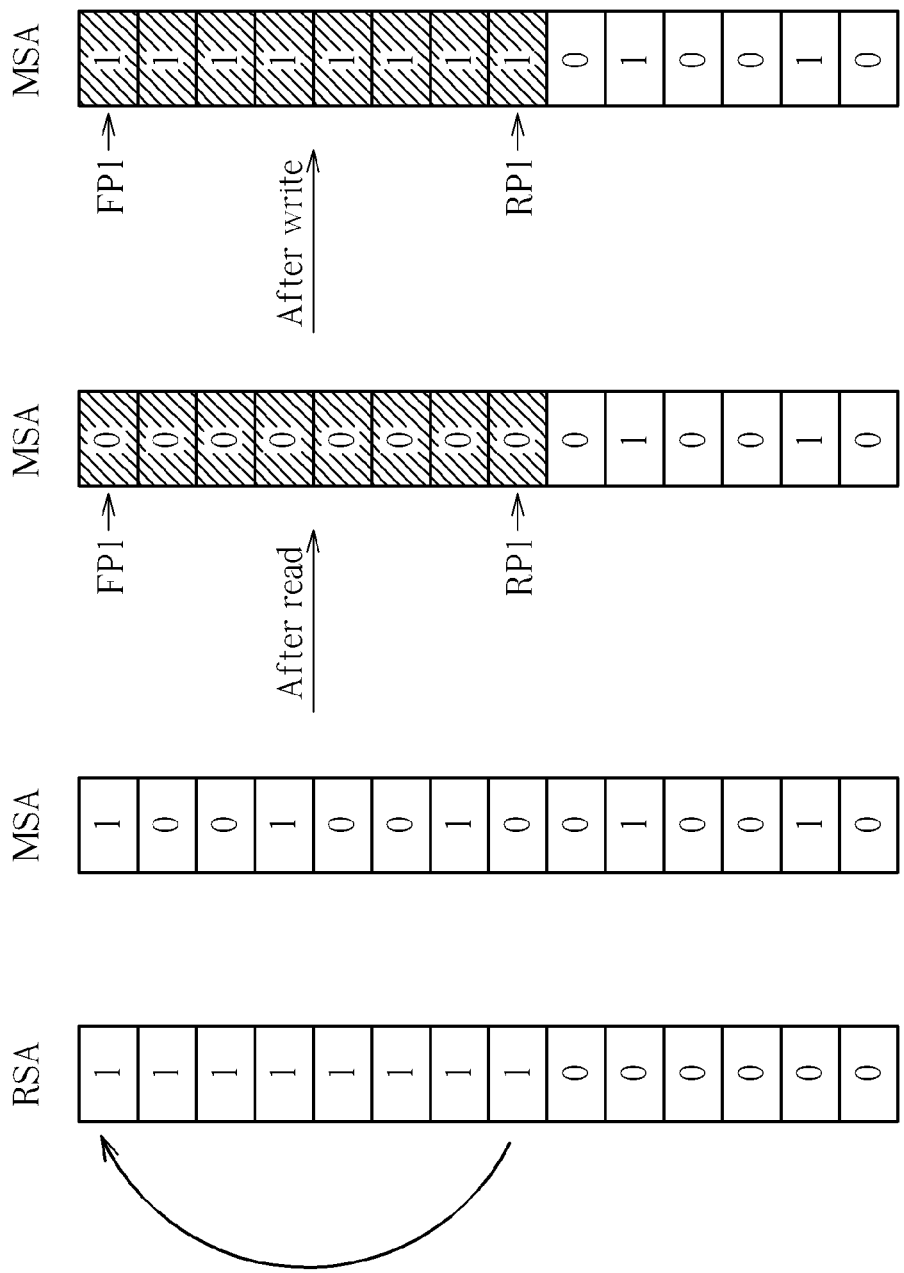
FIG. 5 illustrates how to read or write physical memory segments by using a range status array according to one embodiment of the present invention.

Please refer to FIG. 5, which illustrates the condition (A) according to one embodiment of the present invention. The initial values in the range status array RSA and the buffer status array MSA are shown in the left side of FIG. 5. It is assumed that a read instruction is first received by the data processing unit 140 and then a write instruction is received by the data processing unit 140. Note that only the slots in the buffer status array MSA indicated by slots having the value 1 in the range status array RSA are updated, as indicated by the allowance of access in the rule (b), whereas the slots in the buffer status array MSA indicated by slots having the value 0 in the range status array RSA are not updated, as indicated by the prohibition of access mentioned in the rule (b).

When the read instruction is first met, the physical memory segments mapped by the slots having value 1 in the buffer status array MSA indicated by slots having value 1 in the range status array RSA are allowed to be read this time, according to the rules (a) and (b), the values of slots in the buffer status array MSA indicated by slots having value 1 in the range status array RSA are all updated to 0 after said physical memory segments are read; values of slots in the buffer status array MSA indicated by slots having value 0 in the range status array RSA are kept under the read instruction, and the physical memory segments mapped by the slots having the kept values in the buffer status array MSA are not allowed to be read at this time.

Then, when the write instruction is met, the physical memory segments mapped by the slots having value 0 in the buffer status array MSA indicated by the slots having value 1 in the range status array RSA are allowed to be written at this time, according to the rules (a) and (b), the values of slots in the buffer status array MSA mapped by the slots having the value 1 in the range status array RSA are all updated to 1 after said physical memory segments are written; the values of the slots in the buffer status array MSA indicated by the slots having the value 0 in the range status array RSA are still kept, and the physical memory segments mapped by the slots having the kept values in the buffer status array MSA are not allowed to be written at this time.

As can be observed in FIG. 5, slots having the value 1 in the range status array RSA are continuous, and so are slots having the value 0 in the range status array RSA. It indicates the fact that in each write or read instruction using the range status array RSA, the corresponding updated slots in the buffer status array MSA are also continuous, i.e., the buffer status array MSA acts as an accessing-by-block array, where a length of the continuous updated slots in the buffer status array MSA, i.e. a range of using the range status array RSA, can also be determined before using the range status array RSA; therefore, a front pointer FP1 and a rear pointer RP1 can be assigned to the begin slot and the end slot of the range on the buffer status array MSA while performing the read/write instruction by using the range status array RSA, as shown in FIG. 5. Both the front pointer FP1 and the rear pointer RP1 should be assigned according to an accessing direction of the buffer status array MSA. Note that the above-mentioned memory wrapping, i.e. the rule (f), can also be utilized on the range of using the range status array RSA when the range exceeds the bottom of the buffer status array MSA. At the end of a write/read instruction, the last slot in the buffer status array MSA is assigned to be pointed by the rear pointer RP1 so that said last slot can be re-assigned to be pointed by the front pointer FP1 when a next write/read operation is met.

(B) Read or Write Physical Memory Segments by Using the Queue Status Array QSA:

By following the above-mentioned basic flow, when a master unit is occupied by the slave unit, i.e. by the data processing unit 140, the queue status array QSA is selected and set according to the steps (T1) and (T2).

Figure 6:
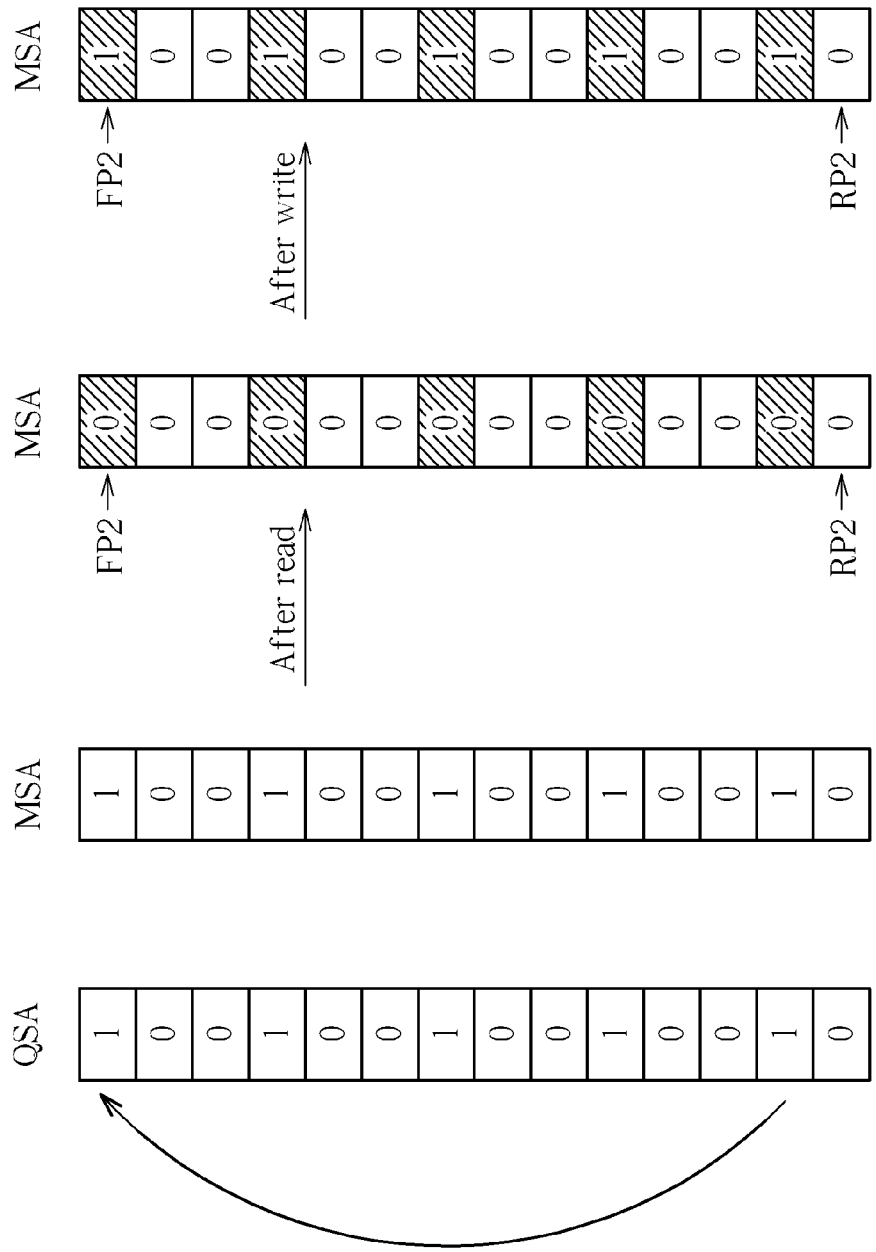
FIG. 6 illustrates how to read or write physical memory segments by using a queue status array according to one embodiment of the present invention.

Please refer to FIG. 6, which illustrates the condition (B) according to one embodiment of the present invention. The initial values in the queue status array QSA and the buffer status array MSA are shown in the left side of FIG. 6. It is assumed that a read instruction is first received by the data processing unit 140 and then a write instruction is received by the data processing unit 140. Note that the slots in the buffer status array MSA indicated by slots having the value 1 in the queue status array QSA are allowed to be accessed, whereas the slots in the buffer status array MSA indicated by slots having the value 0 in the queue status array QSA are forbidden to be accessed, as indicated by the rule (c).

When the read instruction is first met, the physical memory segments mapped by the slots having value 1 in the buffer status array MSA indicated by slots having the value 1 in the queue status array QSA are allowed to be accessed, i.e. read, according to the rules (a) and (c), the values of slots in the buffer status array MSA indicated by the slots having value 1 in the queue status array QSA are all updated to 0 after said physical memory segments are accessed, i.e. read; the physical memory segments mapped by slots having values 0 or 1 in the buffer status array MSA indicated by slots having the value 0 in the queue status array QSA are not allowed to be accessed, i.e. not allowed to be read.

Then, when the write instruction is met, the physical memory segments mapped by the slots having value 0 in the buffer status array MSA indicated by slots having the value 1 in the queue status array QSA are allowed to be accessed, i.e. written, according to the rules (a) and (c), the values of slots in the buffer status array MSA indicated by the slots having the value 1 in the queue status array QSA are all updated to 1 after said physical memory segments are accessed, i.e. written; the physical memory segments mapped by slots having values 0 or 1 in the buffer status array MSA indicated by slots having the value 0 in the queue status array QSA are not allowed to be accessed, i.e. not allowed to be written.

As can be observed in FIG. 6, slots having the value 1 in the queue status array QSA are not continuous, i.e., the queue status array QSA acts as an accessing-by-spaced-interval status array since each neighboring pair of slots having the value 1 in the queue status array QSA are spaced by a constant amount of slots having the value 0 in the queue status array QSA. Both a front pointer FP2 and a rear pointer RP2 are also assigned in the queue status array QSA while meeting a write/read instruction by using the queue status array QSA. Except for the range utilized in the range status queue RSA, how the front pointer FP2 and the rear pointer RP2 are utilized, how a direction of accessing the buffer status array MSA is determined according to both the front pointer FP2 and the rear pointer RP2, and how the memory wrapping is utilized are similar to those described when using the range status array RSA, and the related details are not repeatedly disclosed.

By using the queue status array QSA to read or write data, data can be read or written in a discrete manner for better memory shuffling, without modifying contents of physical memory segments that are not allowed to be modified.

(C) Internal Data Moving by Using Both the Range Status Array RSA and the Queue Status Array QSA:

When performing internal data moving of the physical memory segments mapped by the buffer status array MSA, each internal data moving instruction includes a slot in the range status array RSA as a source, and includes a slot in the queue status array QSA as a target. Note that the source and target cannot indicate to a same slot in the buffer status array MSA since it cannot move data on a same physical memory segment mapped by the same slot in the buffer status array MSA as a source and a target simultaneously. Note that a front pointer and a rear pointer may also be set and updated for the internal data moving instruction for the buffer status array MSA to indicate the source and the target of the internal data moving instruction.

Figure 7:
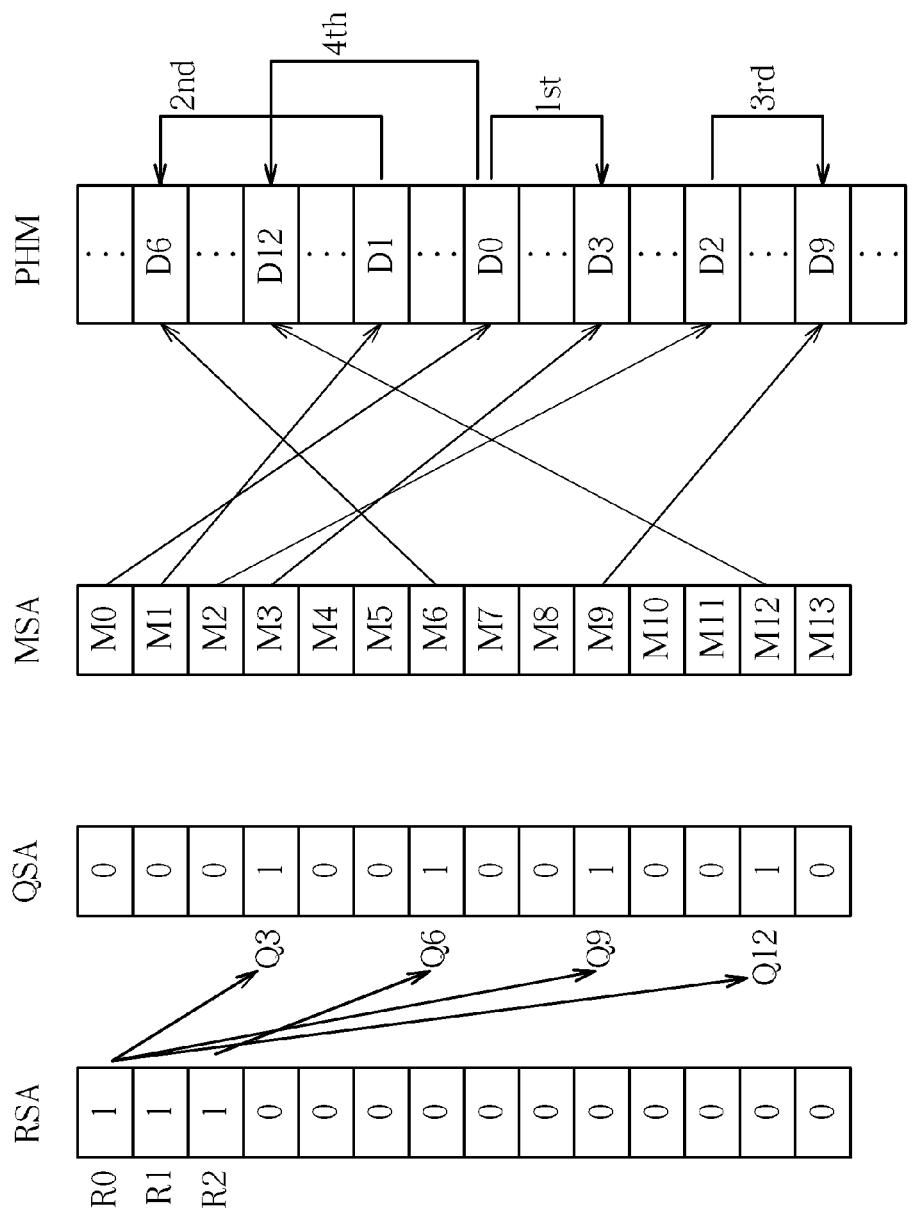
FIG. 7 illustrates how to implement an internal data moving instruction by using both a range status array and a queue status array according to one embodiment of the present invention.

Please refer to FIG. 7, which schematically illustrates how data moving is performed using the range status array RSA, the queue status array QSA, the buffer status array MSA, and a physical memory region PHM including a plurality of physical memory segments D0, D1, D2, D3, D6, D9, and D12 respectively mapped by slots M0, M1, M2, M3, M6, M9, and M12 in the buffer status array MSA, where the physical memory region PHM is disposed in the buffer 170. In one embodiment of the present invention, each of the physical memory segments in the physical memory region PHM, for example, each of the physical memory segments D0, D1, D2, D3, D6, D9, and D12, has a size of 512 bytes; however, in other embodiments of the present invention, a size of each of the physical memory segments in the physical memory region PHM is adjustable. As can be observed in FIG. 7, only three slots R0, R1, and R2 having the value 1 in the range status array RSA indicate sources of internal data moving instructions, only four slots Q3, Q6, Q9, and Q12 having the value 1 in the queue status array QSA indicate targets of the internal data moving instructions.

The mappings from the sources indicated by the range status array RSA to the targets indicated by the queue status array QSA are utilized in an in-order and memory-wrapping manner. Therefore, there will be four internal data moving instructions in FIG. 7: a first instruction is defined by the slots R0 and Q3 and is configured to move a datum from the physical memory segment D0 to the physical memory segment D3; a second instruction is defined by the slot R1 and Q6 and is configured to move a datum from the physical memory segment D1 to the physical memory segment D6; a third instruction is defined by the slot R2 and Q9 and is configured to move a datum from the physical memory segment D2 to the physical memory segment D9; and a fourth instruction is defined by the slots R0 and Q12 because of the memory wrapping mechanism, and is configured to move a datum from the physical memory segment D0 to the physical memory segment D12.

Note that values of the buffer status array MSA are not required to be checked when performing the internal data moving instruction, and the spaces between any two neighboring slots having the value 1 in the queue status array QSA do not necessarily have a same or constant length, as shown in FIG. 7.

By using both the range status array RSA and the queue status array QSA to perform the internal data moving instruction, better memory relocation can be fulfilled.

(D) Partial Valid Data Moving by Using Both the Range Status Array RSA and the Queue Status Array QSA:

While running a partial data moving instruction, the interface 130 is responsible for data transmission between the host 110 and the buffer controller 200, and the rear processing engine 150 is responsible for data transmission between the buffer controller 200 and the flash memory 120.

When the partial valid data instruction is configured to transfer data from the host 110 to the flash memory 120, i.e. when the partial valid data instruction is a write instruction, the interface 130 is configured to receive data from the host 110 and for buffering the received data into the buffer 170, the rear processing engine 150 is configured to transfer the data from the buffer 170 to the flash memory 120. When the rear processing engine 150 transfers data from the buffer 170 to the flash memory 120, the queue status array QSA is utilized for indicating valid memory addresses in the buffer 170, and the range status array RSA is utilized for determining how many continuous memory addresses of data is to be written into the flash memory 120 at a time, i.e. for determining a length of memory addresses for writing.

When the partial valid data instruction is configured to transfer data from the flash memory 120 to the host 110, i.e. when the partial valid data instruction is a read instruction, the rear processing engine 150 is configured to receive data from the flash memory 120 and for buffering the received data into the buffer 170, the interface 130 is configured to transfer the data from the buffer 170 to the host 110. When the rear processing engine 150 transfers data from the flash memory 120 to the buffer 170, the range status array RSA is utilized for indicating a length of reading data, i.e., for indicating how many continuous memory addresses of data is to be read, and the queue status array QSA is utilized for indicating valid memory addresses in the buffer 170 so that the interface 130 transfers data from the indicated valid memory addresses in the buffer 170 to the host 110. Note that data buffered in invalid memory addresses are restricted from being accessed, i.e., read, while running the partial valid data instruction for reading.

Figure 8:
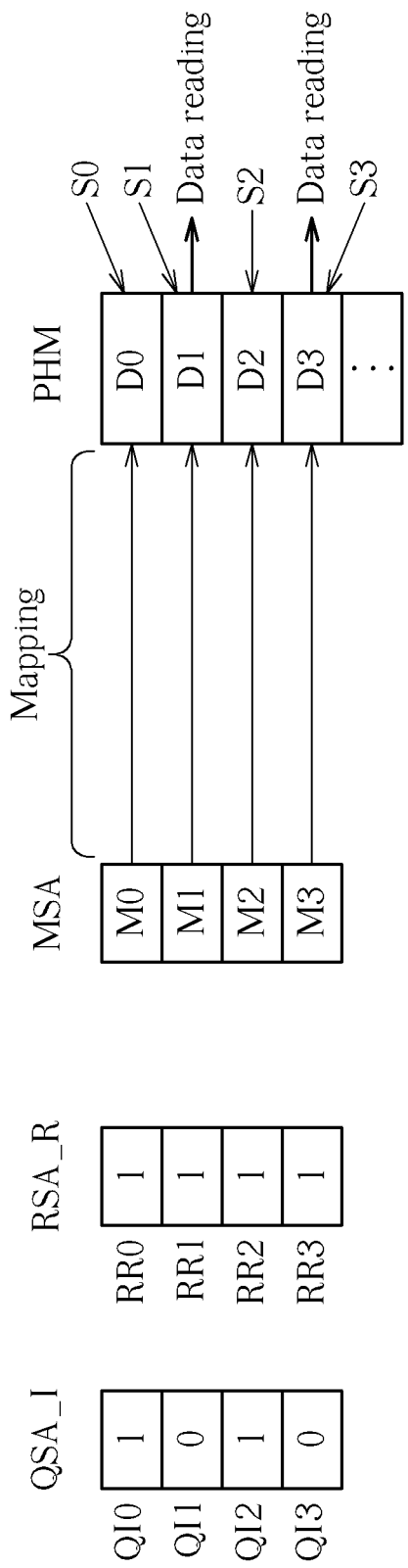
FIG. 8 illustrates how to implement a partial valid data moving instruction by using both a range status array and a queue status array.

Please refer to FIG. 8, which illustrates how a partial valid data moving instruction works according to one embodiment of the present invention. It is assumed that slots QI0, QI1, QI2, QI3 of a queue status array QSA_I correspond to slots M0, M1, M2, M3 of the buffer status array respectively, and that slots RR0, RR1, RR2, RR3 in a range status array RSA_R correspond to the slots M0, M1, M2, M3 of the buffer status array MSA respectively. It is also assumed that the slots M0, M1, M2, M3 map to physical memory segments S0, S1, S2, S3 of the physical memory region PHM disposed in the buffer 170 respectively, where the physical memory segments S0, S1, S2, and S3 contain data D0, D1, D2, and D3 respectively.

When the partial valid data moving instruction is a write instruction, the queue status array QSA indicates a first fact that the physical memory segments S0 and S2 are valid, and a second fact that the physical memory segments S1 and S3 are invalid; the range status array RSA_R indicates a length of writing is four, i.e., four continuous memory addresses indicated by the slots RR0, RR1, RR2, RR3 at a time. As a result, the data D0, D1, D2 and D3 are written into the flash memory 120 since the slots RR0, RR1, RR2, RR3 indicate the length of writing, wherein the D1 and D3 could be dummy datum since the slots QI1 and QI3 indicate the invalidity of physical memory segments S1 and S3.

Similarly, when the partial valid data moving instruction is a read instruction, the physical memory segments S0 and S2 are read into the host 110 since the slots QI0 and QI2 indicate the validity of the physical memory segments S0 and S2, whereas the physical memory segments S1 and S3 are restricted from being accessed since the slots QI1 and QI3 indicate the invalidity of the physical memory segments S1 and S3.

Note that values of the buffer status array MSA are not required to be checked when performing the partial valid data moving, and the spaces between any two neighboring slots having the value 1 in the queue status array QSA do not necessarily have a same or constant length. Besides, the buffer status array MSA is also applied for the abovementioned memory wrapping so that a front pointer and a rear pointer are also utilized according to one embodiment of the present invention.

By restricting invalid physical memory segments of the buffer 170 from being accessed, performance of the buffer controller 200 will not be affected by the invalid physical memory segments of the buffer 170.

In summary of the abovementioned conditions (A)-(D), with the aid of the range status array RSA and/or the queue status array QSA, the clocks between the slave unit and its corresponding master units can be unified since clocks related to operations of the buffer controller 200 is based on the clock of the slave unit.

Figure 9:
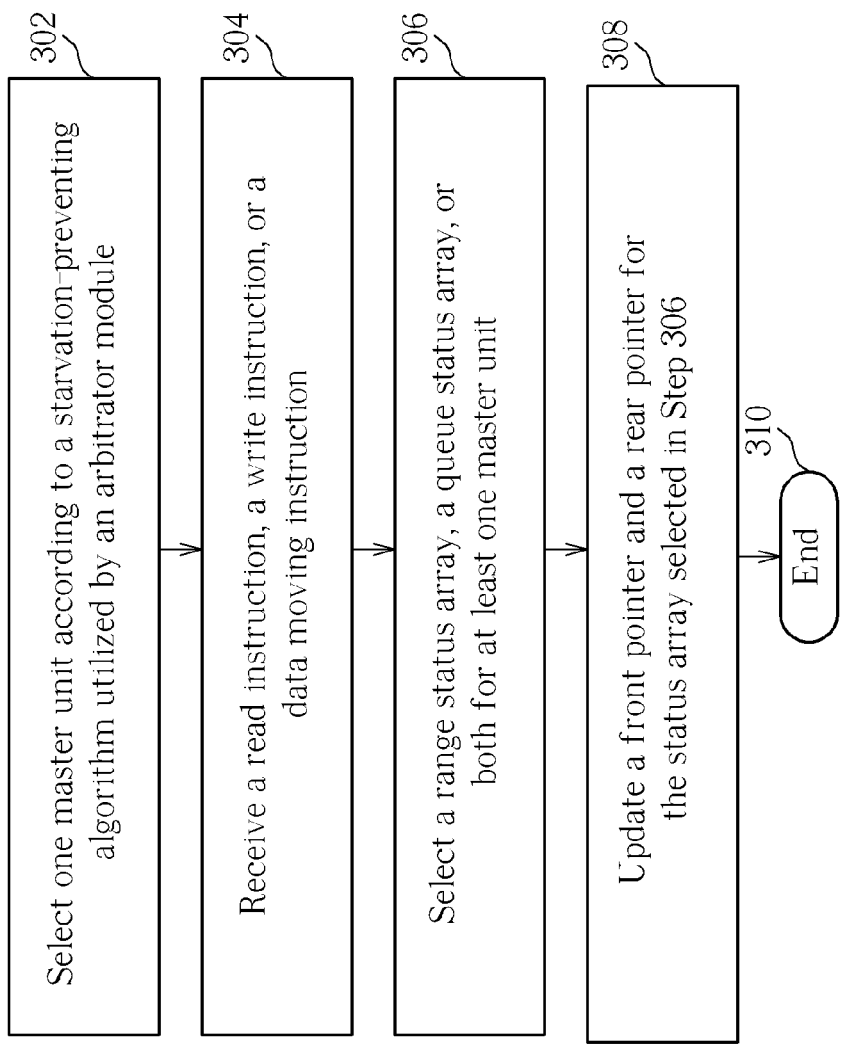
FIG. 9 illustrates a main flow for implementing the buffer managing method of the present invention.

Please refer to FIG. 9, which illustrates a main flow indicating the basic flow including the steps (T1)-(T4). As shown in FIG. 9, the main flow includes steps as follows:

Step 302: Select one master unit according to a starvation-preventing algorithm utilized by the arbitrator module 180.

Step 304: Receive a read instruction, a write instruction, or a data moving instruction.

Step 306: Select a range status array, a queue status array, or both for at least one master unit.

Step 308: Update a front pointer and a rear pointer for the status array selected in Step 306.

Step 310: End.

Figure 10:
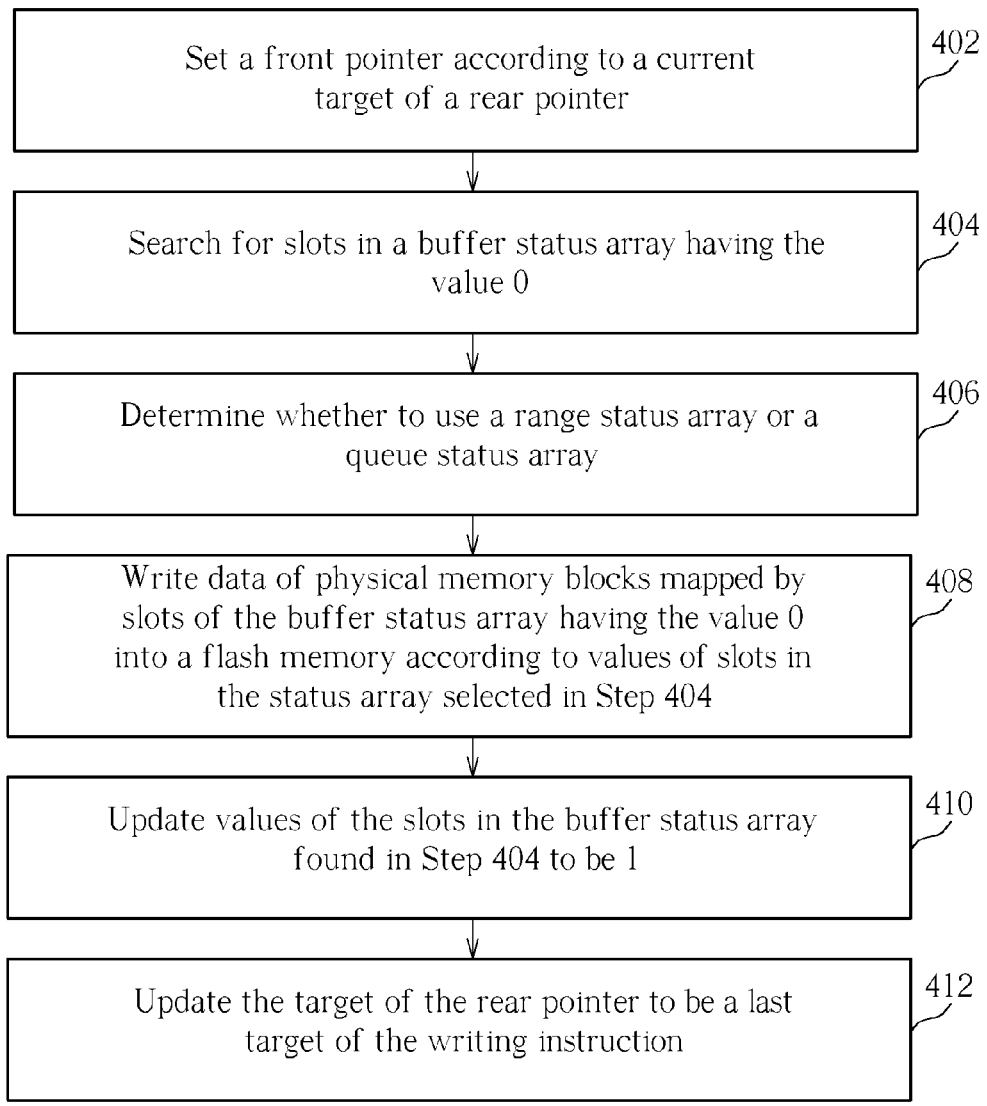
FIG. 10 illustrates a flowchart of performing a writing instruction performed by a buffer controller according to embodiments shown in FIG. 5 and FIG. 6.

Please refer to FIG. 10, which illustrates a writing instruction performed by the buffer controller 200 according to embodiments of the present invention, as described in the abovementioned conditions (A) and (B). As shown in FIG. 10, the writing instruction includes steps as follows:

Step 402: Set a front pointer according to a current target of a rear pointer.

Step 404: Search for slots in the buffer status array MSA having the value 0.

Step 406: Determine whether to use the range status array RSA or the queue status array QSA.

Step 408: Write data of physical memory segments mapped by slots of the buffer status array MSA having the value 0 into the flash memory 120 according to values of slots in the status array selected in Step 404.

Step 410: Update values of the slots in the buffer status array MSA found in Step 404 to be 1.

Step 412: Update the target of the rear pointer to be a last target of the writing instruction.

Figure 11:
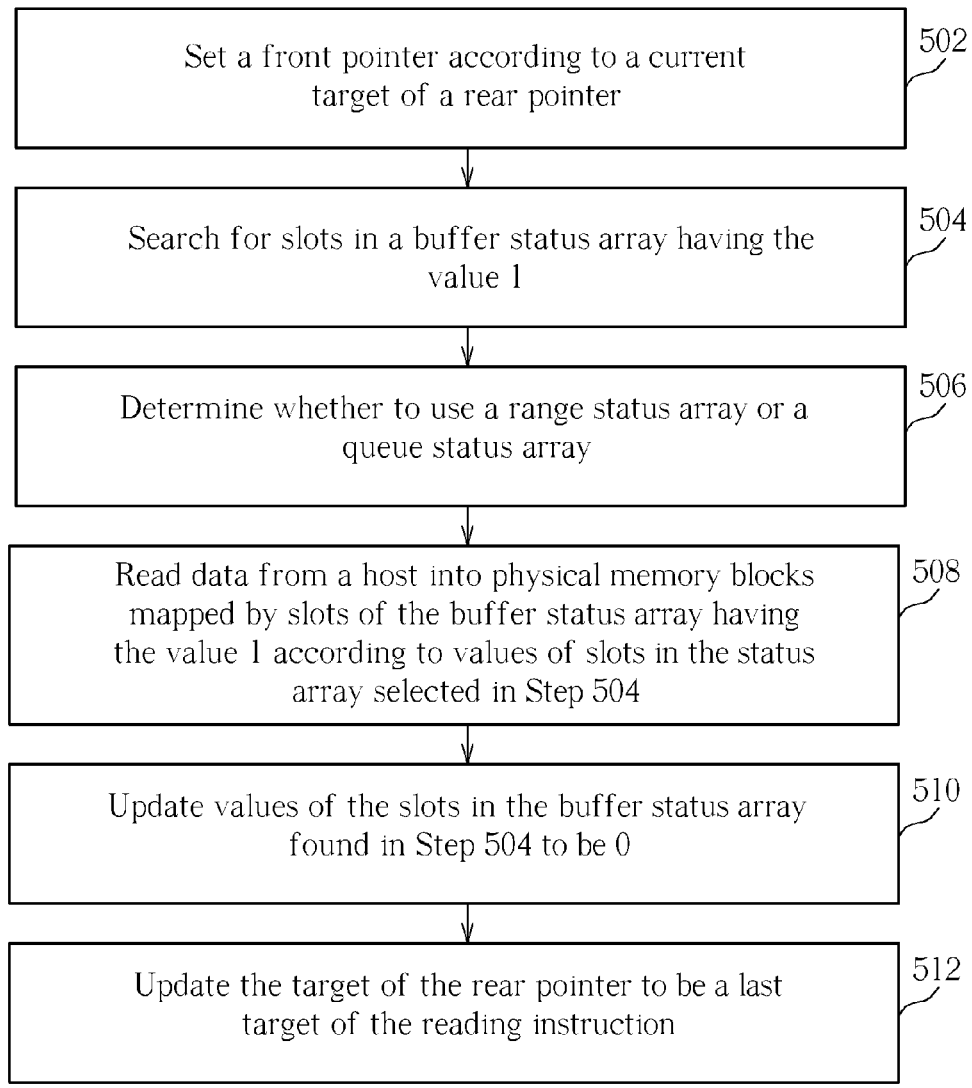
FIG. 11 illustrates a flowchart of performing a reading instruction performed by a buffer controller according to embodiments shown in FIG. 5 and FIG. 6.

Please refer to FIG. 11, which illustrates a reading instruction performed by the buffer controller 200 according to embodiments of the present invention, as described in the abovementioned conditions (A) and (B). As shown in FIG. 11, the reading instruction includes steps as follows:

Step 502: Set a front pointer according to a current target of a rear pointer.

Step 504: Search for slots in the buffer status array MSA having the value 1.

Step 506: Determine whether to use the range status array RSA or the queue status array QSA.

Step 508: Read data from the host 110 into physical memory segments mapped by slots of the buffer status array MSA having the value 1 according to values of slots in the status array selected in Step 504.

Step 510: Update values of the slots in the buffer status array MSA found in Step 504 to be 0.

Step 512: Update the target of the rear pointer to be a last target of the reading instruction.

Please refer to FIG. 12, which illustrates the internal data moving instruction performed by the buffer controller 200 according to embodiments of the present invention, as described in the abovementioned condition (C). As shown in FIG. 12, the internal data moving instruction includes steps as follows:

Step 602: Move a datum from a first physical memory segment to a second physical memory segment when a slot in the range status array RSA corresponding to a first slot of the buffer status array MSA mapping the first physical memory segment has the value 1 and when a slot in the queue status array QSA corresponding to a second slot of the buffer status array MSA mapping the second physical memory segment has the value 1.

Please refer to FIG. 13, which illustrates the partial valid data moving instruction performed by the buffer controller 200 according to embodiments of the present invention, as described in the abovementioned condition (D). As shown in FIG. 13, the partial valid data moving instruction includes steps as follows:

Step 702: Accessing a datum buffered at a physical memory segment of the buffer 170 when a first slot in the queue status array QSA_I corresponding to a second slot of the buffer status array MSA mapping a physical memory segment has the value 1 and when a third slot in the range status array RSA_R corresponding to the second slot of the buffer status array MSA has the value 1.

Embodiments formed by reasonable combination and permutation of or formed by adding the abovementioned limitations to the steps shown in FIG. 9, FIG. 10, FIG. 11, FIG. 12, and FIG. 13 should also be regarded as embodiments of the present invention.

The present invention discloses a buffer managing method and a buffer controller for neutralizing the asynchronous clocks between elements of a conventional buffer controller.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A buffer managing method, comprising:
receiving data from a host to a set of physical memory segments of a buffer of a buffer controller, the set of physical memory segments having corresponding buffer status slots indicating allowance to write on the set of physical memory segments and having corresponding accessing-by-block status slots indicating the set of physical memory segments is current datum receiving targets;

changing status of the buffer status slots corresponding to the set of physical memory segments receiving data from the host to indicate allowance to read;

outputting data from a plurality of physical memory segments of the buffer to a flash memory, the plurality of physical memory segments having corresponding buffer status slots indicating allowance to read and having corresponding accessing-by-block status slots indicating the plurality of physical memory segments are current datum outputting sources; and changing status of the buffer status slots corresponding to the plurality of physical memory segments outputting data from the plurality of physical memory segments to indicate allowance to write;

wherein the plurality of physical memory segments include the set of physical memory segments, and the accessing-by-block status slots indicate that the plurality of physical memory segments are consecutive.

2. The buffer managing method of claim 1 wherein a quantity of the buffer status slots corresponding to the plurality of physical memory segments is determined according to a range of the accessing-by-block status slots corresponding to the plurality of physical memory segments by a master unit of the buffer controller at a time.

3. The buffer managing method of claim 1 wherein an accessing-by-block status array including accessing-by-block status slots corresponding to the plurality of physical memory segments is assigned in the buffer for a master unit of the buffer controller.

4. The buffer managing method of claim 3 wherein the master unit is an interface, a micro-processor, or a rear processing unit of the buffer controller.

5. The buffer managing method of claim 3 further comprising:
determining the master unit from a plurality of candidate master units of the buffer controller to access the buffer by using a starvation-preventing algorithm.

6. The buffer managing method of claim 5 wherein the starvation-preventing algorithm is a round-robin algorithm.

7. The buffer managing method of claim 1 further comprising:
updating a rear pointer of the plurality of physical memory segments to point to a last physical memory segment receiving data from the host or to point to the last physical memory segment outputting data to the flash memory; and
updating a front pointer of the plurality of physical memory segments to point to a first physical memory segment receiving data from the host or to point to the first physical memory segment outputting data to the flash memory.

8. A buffer managing method, comprising:
receiving data from a host to a set of physical memory segment of a buffer of a buffer controller, the set of physical memory segments having corresponding buffer status slots indicating allowance to write on the set of physical memory segments and having corresponding accessing-by-spaced-interval status slots indicating the set of physical memory segment is current datum receiving targets;

changing status of the buffer status slots corresponding to the set of physical memory segments receiving data from the host to indicate allowance to read;

outputting data from a plurality of physical memory segments of the buffer to a flash memory, the plurality of physical memory segments having corresponding buffer status slots indicating allowance to read and having corresponding accessing-by-spaced-interval status slots indicating the plurality of physical memory segments are current datum outputting sources; and changing status of the buffer status slots corresponding to the plurality of physical memory segments outputting data from the plurality of physical memory segments to indicate allowance to write;

wherein the plurality of physical memory segments include the set of physical memory segments, and the accessing-by-spaced-interval status slots indicate that the plurality of physical memory segments are intermittent.

9. The buffer managing method of claim 8 wherein an accessing-by-spaced-interval status array including the accessing-by-spaced-interval status slots corresponding to the plurality of physical memory segments is assigned in the buffer for a master unit of the buffer controller.

10. The buffer managing method of claim 9 wherein the master unit is an interface, a micro-processor, or a rear processing unit of the buffer controller.

11. The buffering managing method of claim 9 further comprising:
determining the master unit from a plurality of candidate master units of the buffer controller to access the buffer by using a starvation-preventing algorithm.

12. The buffer managing method of claim 11 wherein the starvation-preventing algorithm is a round-robin algorithm.

13. The buffer managing method of claim 8 further comprising:
updating a rear pointer of the plurality of physical memory segments to point to a last physical memory segment receiving data from the host or to point to the last physical memory segment outputting data to the flash memory; and
updating a front pointer of the plurality of physical memory segments to point to a first physical memory segment receiving data from the host or to point to the first physical memory segment outputting data to the flash memory.

14. A buffer managing method, comprising:
moving data from a first physical memory segment of a buffer of a buffer controller to a second physical memory segment of the buffer when an accessing-by-block status slot and a buffer status slot corresponding to the first physical memory segment indicate that the first physical memory segment is a current source of a data moving instruction for moving data and when an accessing-by-spaced-interval status slot and a buffer status slot corresponding to the second physical memory segment indicate that the second physical memory segment is a current target of the data moving instruction;
changing status of the buffer status slot corresponding to the second physical memory segment to indicate the second physical memory segment is a current source of another data moving instruction;
changing status of the buffer status slot corresponding to the first physical memory segment to indicate the first physical memory segment is a current target of the another data moving instruction;

wherein each physical memory segment of the buffer has a corresponding buffer status slot to indicate whether the each physical memory segment is allowed to read or write;
wherein buffer status slots are elements of a buffer status array;
wherein accessing-by-block status slots are utilized for accessing a plurality of physical memory segments mapped by a corresponding plurality of consecutive buffer status slots in the buffer status array at a time;
wherein accessing-by-spaced-intervals status slots are elements of an accessing-by-spaced-interval status array utilized for accessing a plurality of physical memory segments mapped by a corresponding plurality of intermittent buffer status slots; and
wherein an accessing-by-block status array comprises of accessing-by-block status slots; each of the accessing-by-block status slots corresponds to one of the consecutive buffer status slots.

15. The buffer managing method of claim 14 further comprising:
updating a rear pointer of the physical memory segments to point to a last physical memory segment targeted by the data moving instruction when executing the data moving instruction; and
updating a front pointer of the physical memory segments to point to a first physical memory segment targeted by the data moving instruction.

16. A buffer managing method, comprising:
accessing data of a physical memory segment of a buffer by another physical memory segment of the buffer according to a data moving instruction, when an accessing-by-spaced interval status slot and a buffer status slot corresponding to the physical memory segment indicate that the physical memory segment is allowed to be accessed by the another physical memory segment, and when an accessing-by-block status slot and a buffer status slot corresponding to the another physical memory segment indicate that the another physical memory segment is allowed to access the physical memory segment;
changing status of the buffer status slot corresponding to the physical memory segment to indicate allowance to access a different physical memory segment;
changing status of the buffer status slot corresponding to the another physical memory segment to indicate allowance to be accessed;
wherein each physical memory segment of the buffer has a corresponding buffer status slot to indicate whether the each physical memory segment is allowed to read or write;
wherein buffer status slots are elements of a buffer status array;
wherein accessing-by-block status slots are utilized for accessing physical memory segments mapped by a corresponding plurality of consecutive buffer status slots in the buffer status array at a time;
wherein accessing-by-spaced-intervals status slots are an elements of an accessing-by-spaced-interval status array utilized for accessing physical memory segments mapped by a corresponding plurality of intermittent buffer status slots in the buffer status array;
wherein an accessing-by-block status array comprises of accessing-by-block status slots; each of the accessing-by-block status slots corresponds to one of the plurality of consecutive buffer status slots.

17. The buffer managing method of claim 16 wherein accessing data of the physical memory segment of the buffer by the another physical memory segment of the buffer according to the data moving instruction comprises a buffer controller transferring data from the buffer to a flash memory or to a host.

18. The buffer managing method of claim 16 further comprising:
updating a rear pointer of the physical memory segments to point to a last physical memory segment targeted by the data moving instruction when executing the data moving instruction; and
updating a front pointer of the physical memory segments to point to a first physical memory segment targeted by the data moving instruction.

19. A buffer controller, comprising:
a buffer having a plurality of physical memory segments, a buffer status array having a plurality of buffer status slots corresponding to the plurality of physical memory segments and configured to simultaneously indicate allowance to write on a set of physical memory segments and indicate allowance to read on physical memory segments other than the set of physical memory segments, an accessing-by-block status array having a plurality of accessing-by-block status slots corresponding to the plurality of buffer status slots and configured to indicate that the plurality of physical memory segments are allowed to be accessed, and an accessing-by-spaced-interval status array having a plurality of accessing-by-spaced-interval status slots corresponding to the plurality of physical memory segments;
at least one master unit for accessing the buffer; and
an arbitration module for determining a master unit among the at least one master unit by using a starvation-preventing algorithm when the buffer controller executes an instruction;
wherein status of the buffer status slots corresponding to the set physical memory segments is changed to indicate allowance to read the set physical memory segments after being written on; status of the buffer status slots corresponding to the physical memory segments other than the set physical memory segments is changed to indicate allowance to write on the physical memory segments other than the set physical memory segments after being read.

20. The buffer controller of claim 19 wherein a first datum is received from a host to a physical memory segment when a buffer status slot corresponding to the physical memory segment indicates allowance of modifying the physical memory segment and when an accessing-by-block status slot corresponding to the physical memory segment indicates that the physical memory segment is a current datum receiving target; and
wherein a second datum is outputted from the physical memory segment to a flash memory when the buffer status slot corresponding to the physical memory segment indicates disallowance of modifying the physical memory segment and when the accessing-by-block status slot corresponding to the physical memory segment indicates that the physical memory segment is a current datum outputting source.

21. The buffer controller of claim 19 wherein a first datum is received from a host to a physical memory segment when a buffer status slot corresponding to the physical memory segment indicates allowance of modifying the physical memory segment and when an accessing-by-spaced-interval status slot corresponding to the physical memory segment indicates that the physical memory segment is a current datum receiving target; and
wherein a second datum is outputted from the physical memory segment to a flash memory when the buffer status slot corresponding to the physical memory segment indicates disallowance of modifying the physical memory segment and when the accessing-by-spaced-interval status slot corresponding to the physical memory segment indicates that the physical memory segment is a current datum outputting source.

22. The buffer controller of claim 19 wherein a datum is moved from a first physical memory segment to a second physical memory segment when an accessing-by-block status slot corresponding to a first physical memory segment indicates that the first physical memory segment is a current source of a data moving instruction for moving the datum and when an accessing-by-spaced-interval status slot corresponding to a second physical memory segment indicates that the second physical memory segment is a current target of the data moving instruction.

23. The buffer controller of claim 19 wherein a datum is written from a host to a physical memory segment when an accessing-by-spaced interval status slot corresponding to the physical memory segment indicates that the physical memory segment is allowed to be written by following a data moving instruction; and
wherein the datum is read from the physical memory segment to a flash memory when an accessing-by-block status slot corresponding to the physical memory segment indicates that the physical memory segment is allowed to be read by following the data moving instruction.

24. The buffer controller of claim 19 wherein the master unit is an interface, a micro-processor, or a rear processing unit of the buffer controller.

25. The buffer controller of claim 19 wherein the starvation-preventing algorithm is a round-robin algorithm.

26. The buffer controller of claim 19 wherein the instruction is a reading instruction, a writing instruction, or a data moving instruction.

* * * * *